(12) United States Patent
Hagen et al.

(10) Patent No.: US 6,237,765 B1
(45) Date of Patent: May 29, 2001

(54) BAIT BUCKET

(75) Inventors: Harold L. Hagen; Kevin H. Hagen, both of Mitchell; Keith L. Hagen, Mt. Vernon, all of SD (US)

(73) Assignee: Mitchell Manufacturing LLC, Mitchell, SD (US)

( * ) Notice: Subject to any disclaimer, the term of this patent is extended or adjusted under 35 U.S.C. 154(b) by 0 days.

(21) Appl. No.: 09/502,892

(22) Filed: Feb. 11, 2000

(51) Int. Cl.[7] ................................................. B65D 85/00
(52) U.S. Cl. ........................ 206/315.11; 43/55; 62/371; 62/457.1; 220/254; 220/318; 220/524; 220/756
(58) Field of Search ................. 206/215.11, 543–545; 43/54.1, 55; 220/318, 756, 762–765, 254, 836, 840, 842, 844, 523, 524, 526, 592.25, 592.2, 915.2; 62/371, 372, 457.1, 457.2, 457.7

(56) References Cited

U.S. PATENT DOCUMENTS

| | | |
|---|---|---|
| D. 257,934 | 1/1981 | Buss . |
| D. 259,760 | 7/1981 | Lucas et al . . |
| D. 266,822 | 11/1982 | Seager . |
| D. 268,979 | 5/1983 | Ruxton . |
| D. 269,398 | 6/1983 | Ruxton . |
| D. 296,065 | 6/1988 | Tarozzi et al. . |
| D. 296,066 | 6/1988 | Tarozzi et al. . |
| D. 309,239 | 7/1990 | Deines et al. . |
| D. 309,396 | 7/1990 | Lundblade et al. . |
| D. 325,324 | 4/1992 | Kahl . |
| D. 327,203 | 6/1992 | Kahl . |
| D. 335,067 | 4/1993 | Hamilton et al. . |
| D. 335,800 | 5/1993 | Hamilton et al. . |
| D. 339,471 | 9/1993 | Maple et al. . |
| D. 349,007 | 7/1994 | Costello . |
| D. 355,568 | 2/1995 | Paulin et al. . |
| 2,243,498 | 5/1941 | Candioto . |
| 3,225,983 * | 12/1965 | Majka ........................................ 43/55 |
| 3,378,134 | 4/1968 | Wilkinson et al. . |
| 3,452,469 * | 7/1969 | White ................................... 662/457.1 |
| 3,882,628 * | 5/1975 | Stouder ..................................... 43/55 |
| 3,958,359 | 5/1976 | Doughty . |
| 4,128,170 | 12/1978 | Elliott . |
| 4,225,052 * | 9/1980 | Tector et al. ............................ 206/545 |
| 4,403,483 * | 9/1983 | Lisalda .................................. 62/457.1 |
| 4,592,482 | 6/1986 | Seager . |
| 4,638,645 * | 1/1987 | Simila .................................... 62/457.1 |
| 4,697,380 | 10/1987 | Fenske . |
| 4,904,007 | 2/1990 | Woodruff . |
| 5,109,625 | 5/1992 | Skrede . |
| 5,169,018 | 12/1992 | Fiore . |
| 5,226,553 * | 7/1993 | Fiore ................................ 206/215.11 |
| 5,272,832 | 12/1993 | Marshall et al. . |
| 5,305,544 * | 4/1994 | Testa, Jr. ........................... 206/315.11 |
| 5,337,911 * | 8/1994 | Holub .................................... 220/254 |

* cited by examiner

Primary Examiner—Luan K. Bui
(74) Attorney, Agent, or Firm—Dorsey & Whitney LLP

(57) ABSTRACT

A fishing bait bucket having an outer shell, an inner bait receiving chamber, a cooling chamber for receiving ice or the like, a main lid covering the outer container with an access lid for accessing only the bait chamber and a carrying handle moveable between latched an unlatched positions to selectively attach and detach the main lid from the outer container.

15 Claims, 10 Drawing Sheets

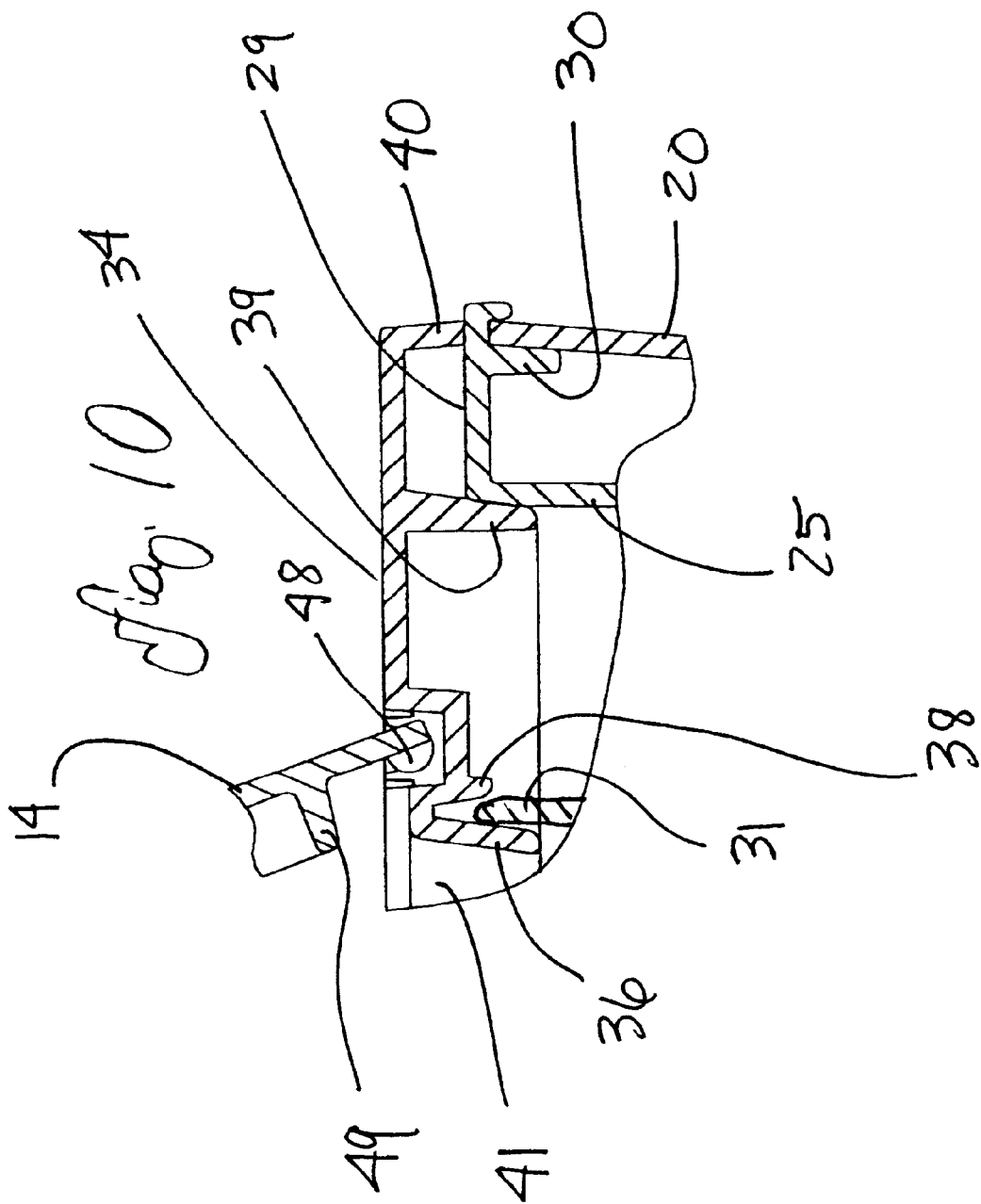

BAIT BUCKET

BACKGROUND OF THE INVENTION

1. Field of the Art

The present invention relates generally to a bait bucket, and more particularly, to a refrigerated fishing bait bucket with an improved access lid.

2. Description of the Prior Art

A variety of fishing tackle boxes and bait buckets exist in the art. For example, U.S. Pat. Nos. 5,226,553 and 5,169,018 both issued to Fiore disclose a tackle box with a lid latching handle and a removable carrying case. These patents, however, fail to disclose any inner compartment or area for ice or other similar material to keep the contents of the tackle box cool.

U.S. Pat. No. 3,958,359 to Doughty discloses a combination receptacle and ice chest for a sportsman. In this disclosure, a container slides into the hollow interior of a base member forming an annular space between the inner walls of the base member and the outer walls of the container. A cover is positioned in the top of the base member and covers both the container and the base member. Thus, this patent fails to show a structure in which access to the interior of the container can be gained without exposing the ice to ambient temperatures. U.S. Pat. No. 5,305,544 to Testa, Jr., discloses a combination bait storage cooler and tackle holder. The apparatus is comprised of an insulated box that includes a main lid. A smaller lid opens into an enclosed area inside the main lid to provide access to fishing bait. However, this patent fails to disclose any external cooling means.

While the above and various other fishing bait containers exist, there is a continuing need for an improved bait bucket which provides better access to the bait, provides improved cooling means and extended cooling time for the bait and provides a more user friendly bucket which can easily be latched and unlatched.

SUMMARY OF THE INVENTION

The present invention provides a fishing bait bucket which is designed primarily to keep fishing bait or the like cool for extended periods of time. The bait bucket of the present invention also provides ready access to the bait when desired without exposing the ice or other coolant to ambient temperatures and provides convenient means for locking the cooling material within the container to achieve the benefits of the invention.

More specifically, the fishing bait bucket in accordance with the present invention includes an outer box or container comprised of thermal insulating material. The bait bucket also includes an inner bait receiving chamber which is located inside the outer box in a fixed position. The inner chamber includes a wall which is spaced inwardly from the outer container wall to define an ice receiving cavity to receive ice or other cooling material.

The bait bucket of the present invention also includes a main lid which covers the open top of the outer container as well as the top of the ice receiving cavity and the bait receiving chamber. The main lid is designed so that it can be selectively attached or detached from, the outer container.

The bait bucket of the present invention also includes an access lid located within the main lid which is positioned in the area of the inner chamber so as to provide access to the inner chamber without removing the main lid from the outer box or exposing the ice within the ice cavity to ambient elements. The bottom or inner surface of the main lid is designed so that it mates with the bait receiving chamber as well as the outer container.

Accordingly, it is an object of the present invention to provide an improved refrigerated bait bucket.

Another object of the present invention is to provide a bait bucket with an access lid for providing access only to the bait.

Another object of the present invention is to provide a bait bucket with a main lid selectively connected to an outer container with a bait access door within the main lid.

These and other objects of the present invention will become apparent with reference to the drawings, the description of the preferred embodiment and the appended claims.

DESCRIPTION OF THE DRAWINGS

FIG. 10 is a view, partially in section, showing the relationship between the main lid, the liner, the access lid and the inner bait receiving chamber.

DESCRIPTION OF THE PREFERRED EMBODIMENT

Figure 1:
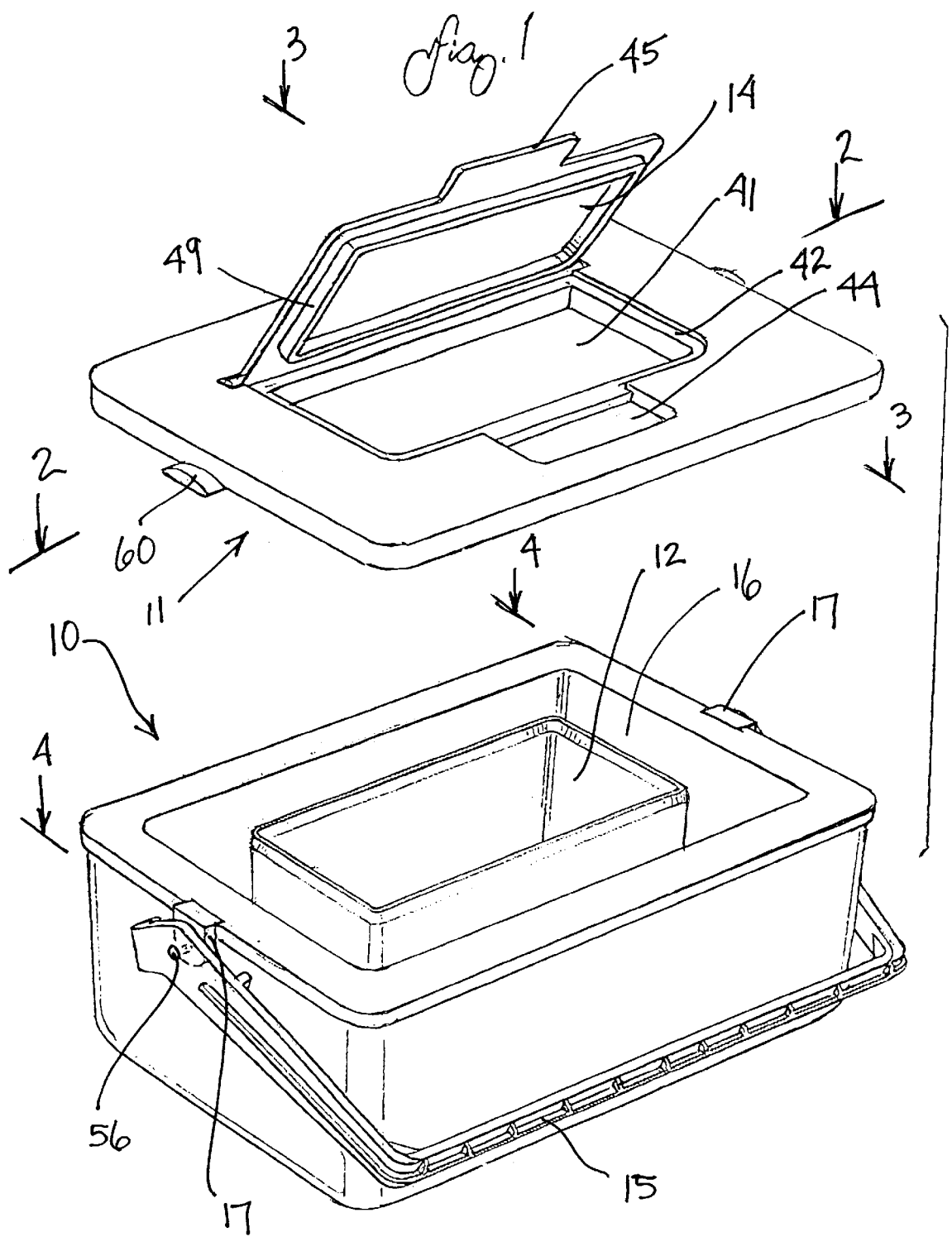
FIG. 1 is an isometric view, with the main lid in a detached position, of the bait bucket of the present invention.

With reference to FIG. 1, the bait bucket in accordance with the present invention generally includes an outer container or box 10 and a selectively removable main lid 11. An inner bait receiving chamber 12 is positioned within the outer container 10, with an ice receiving cavity 16 defined between the chamber 12 and the outer container 10. The main lid 11 includes a hinged access lid 14 which is positioned within the main lid 11 to provide selective access to the bait receiving chamber 12. A handle 15 is pivotally connected to the outer container 10 via a pair of handle mounts 17,17 and is moveable between various carrying and non-carrying positions to selectively attach and detach the main lid 11 from the outer container 10.

Figure 2:
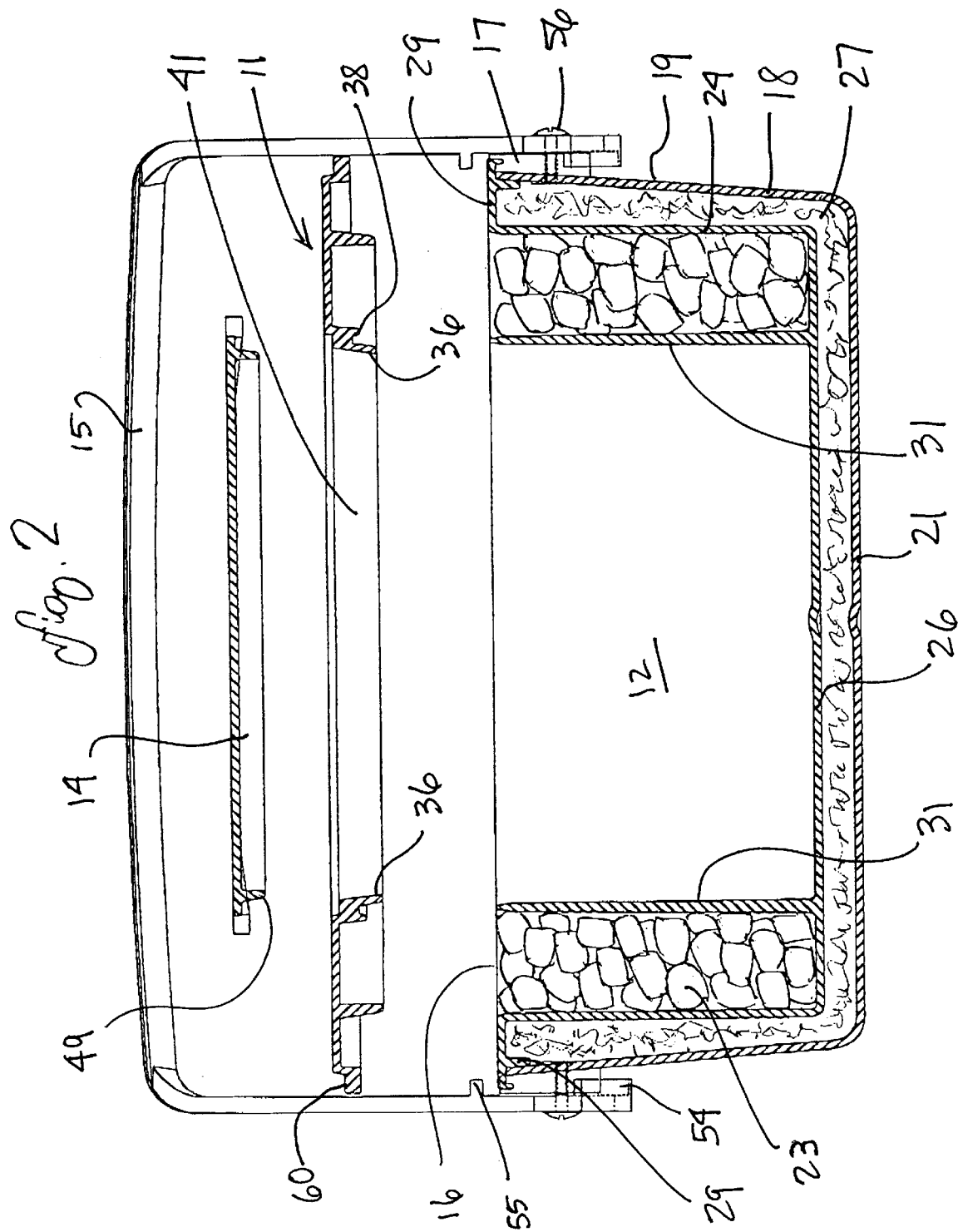
FIG. 2 is an exploded view, partially in section, as viewed along the section line 2—2 of FIG. 1.
Figure 3:
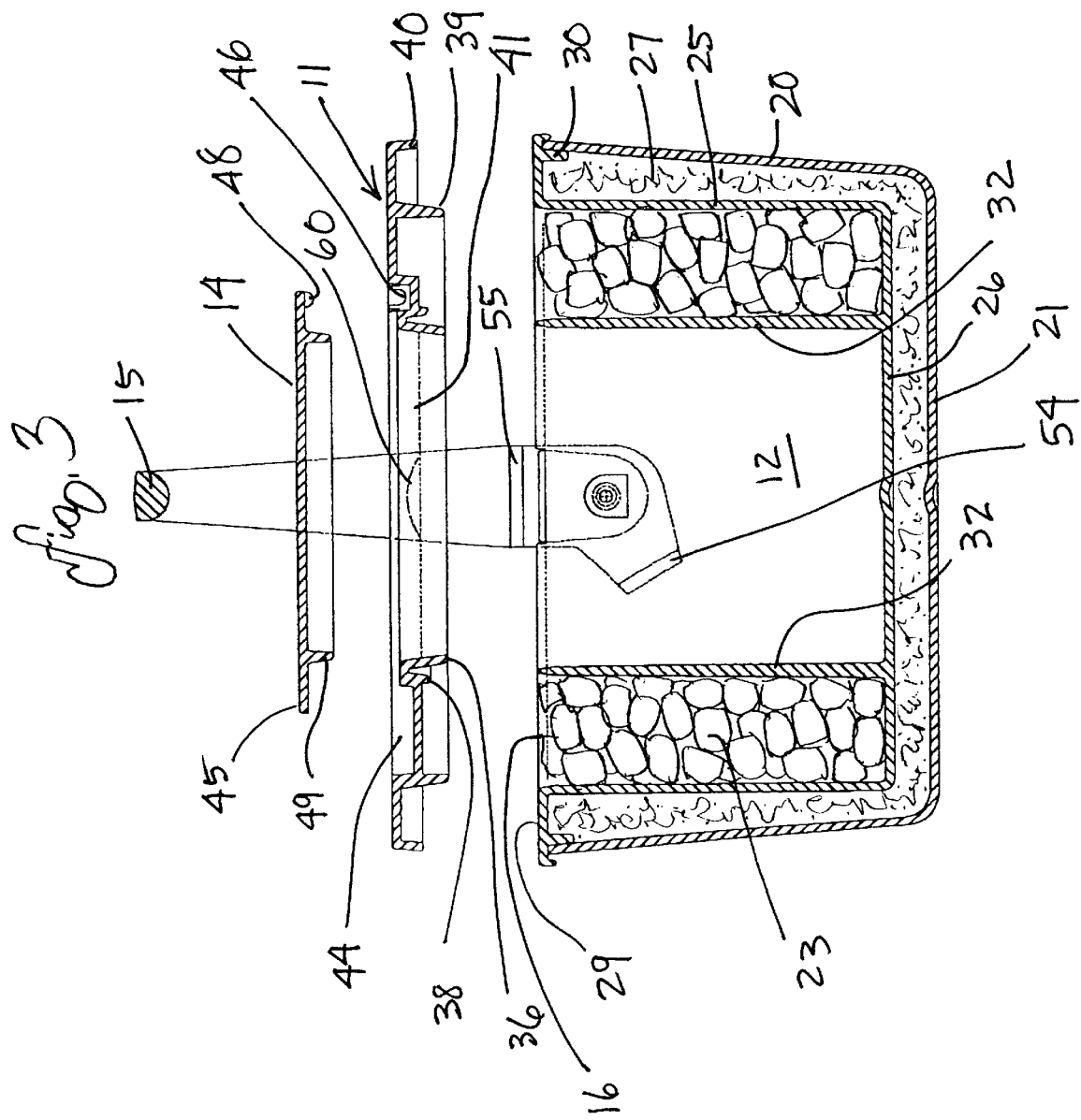
FIG. 3 is an exploded view, partially in section, as viewed along the section line 3—3 of FIG. 1.
Figure 4:
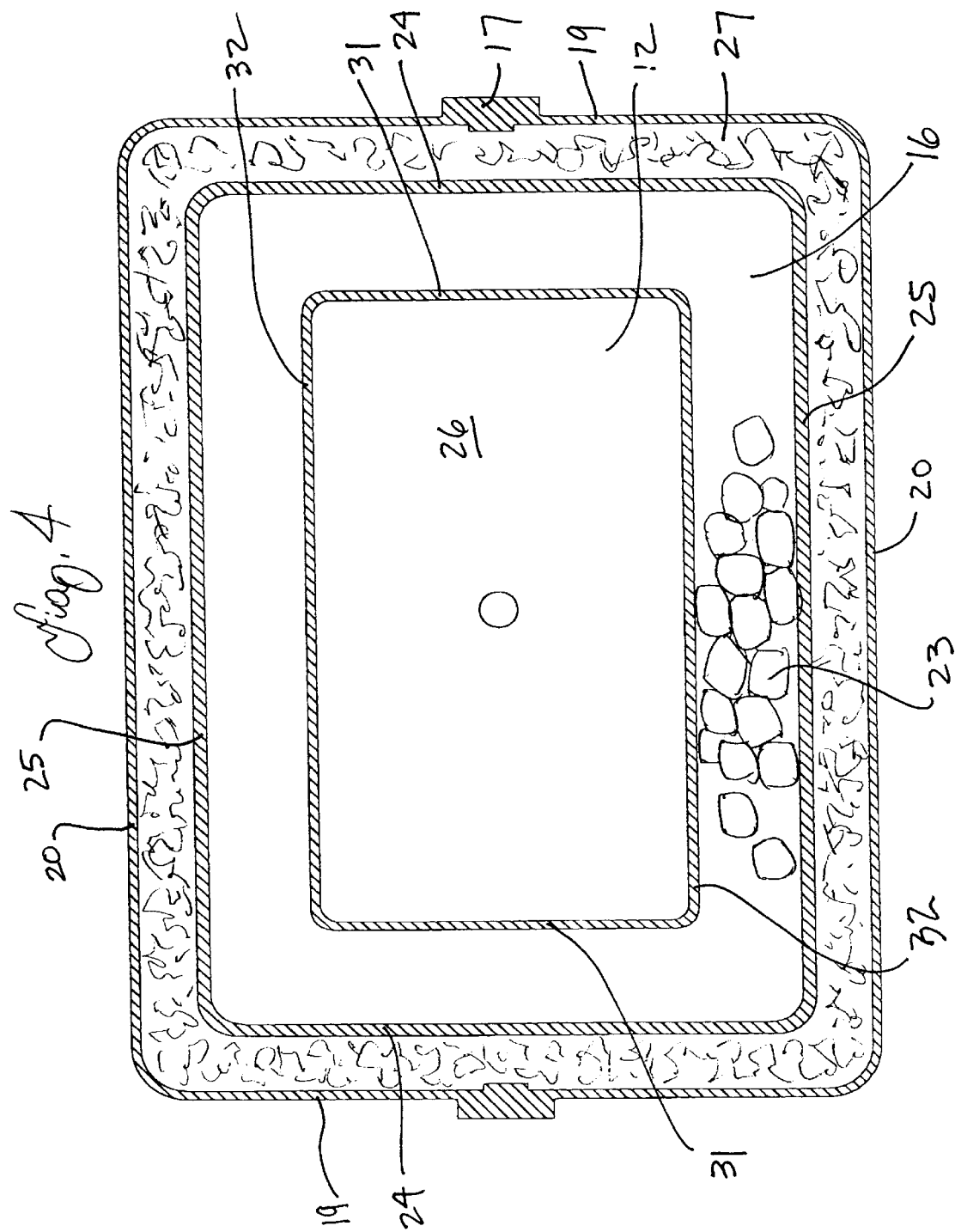
FIG. 4 is a view, partially in section and with the handle removed, as viewed along the section line 4—4 of FIG. 1.

Reference is next made to FIGS. 2, 3 and 4 comprising cross sections of the bait bucket shown in FIG. 1. Specifically, the outer container 10 is comprised in part of an outer shell which includes outer side walls 19,19 (FIG. 2) on opposite sides of the bucket and outer front and back walls 20,20 (FIG. 3) on the front and back of the bucket. A bottom wall 21 is joined with the side walls 19 and the front and back walls 20 and defines the bottom exterior of the bucket. The shell 18 is injection molded and is preferably constructed of polypropylene or some other structurally rigid plastic. In the preferred embodiment, the shell is preferably about ⅛ to ½ inches thick and most preferably about ¼ inches thick.

The inner surface of the outer container 10 is defined by portions of an inner liner illustrated generally in FIGS. 2 and 3 by the reference character 22. The liner 22 includes a pair of opposite side walls 24,24 (FIG. 2) and a pair of opposite front and back walls 25,25 (FIG. 3). As shown, the walls 24,24 are spaced inwardly from the walls 19,19 of the shell 18, and the walls 25,25 are spaced inwardly from the walls 20,20 of the shell 18. The liner 22 further includes a bottom 26 connected with the sides 24 and 25 and is spaced inwardly from, or above, the bottom 21 of the shell 18. As shown best in FIGS. 2 and 3, the spacing between the front, back, side and bottom walls of the shell 18 and the front, back, side and bottom walls of the liner 22 define a cavity 28 to receive a thermally insulated material 27 such as insulating foam or the like.

The liner 22 further includes an upper edge portion 29 extending outwardly from the walls 24 and 25 to the walls 19 and 20, respectively, to define an upper edge portion of the outer container 10 (FIG. 1). The upper edge portion 29 includes a downwardly extending leg 30 designed for engagement and connection with the upper and inner surface portions of the shell walls 19 and 20 as shown in FIG. 2 and 3. The upper edge extends around the entire periphery of the container 10. When the container 10 is assembled, the liner 11 is preferably secured to the shell 18 via a fixed connection.

As further shown in FIGS. 2 and 3, and also in FIGS. 1 and 4, the liner 22 includes upstanding side wall portions 31,31 and upstanding front and back wall portions 32,32 to define the bait receiving chamber 12. The side walls 31,31 are spaced inwardly from the side walls 24,24 (FIGS. 2 and 4) and the walls 32,32 are positioned inwardly from the walls 25,25 (FIGS. 3 and 4) to define an ice receiving cavity 16 therebetween for receiving ice 23 or other cooling means. As shown best in FIGS. 2 and 3, the top edges of the walls 31 and 32 are at the same height or vertical level as the top surface of the top edge portions 29. The walls 31 and 32 extend upwardly from the bottom 26 of the liner 22. Thus, the bottom 26 also serves as the bottom of the bait receiving chamber 12. In the preferred embodiment, the liner 22, and thus the bait receiving chamber 12, is constructed of a structurally rigid plastic such as polypropylene; however, various other materials may be used as well.

With continuing reference to FIGS. 2 and 3, and also to FIG. 10, the main lid 11 includes an outer surface 34 and an inner surface 35. Extending downwardly from the inner surface 35 is a means for mating with the bait receiving chamber 12 and in particular the upper edges of the side walls 31,31 and front and back walls 32,32. In the preferred embodiment, this means includes a pair of mating legs 36 and 38 extending in a closed loop to mate with the continuous upper edge defined by the walls 31 and 32. As shown, these legs 36 and 38 are spaced from one another to accommodate the thickness of the walls 31 and 32 and are beveled outwardly at an angle of approximately 5 to 15° to provide a lead-in or guide surface to guide the upper edges of the walls 31 and 32 into mating relationship with the legs 36 and 38 when the lid 11 is applied to the container 10. In the preferred embodiment, the inner leg 36 is longer than the outer leg 38; however, this could be reversed, or the legs could be of equal length. To further assist in guiding the walls 31 and 32 into mating relationship with the legs 36 and 38, the upper edges of the walls 31 and 32 may be beveled as shown.

The inner surface 35 of the main lid 1I also includes a liner engagement leg 39 extending downwardly from the surface 35 and in a closed loop configuration to mate with the top inner surface of the liner side walls 24,24 and the liner front and back walls 25,25 when the lid is connected with the outer container 10. As shown, the mating leg 39 is preferably beveled inwardly as it extends from the surface 35 to assist in guiding the lid 11 into a seating position relative to the outer container 10.

An outer leg portion 40 extends downwardly from the inner surface 35 at the outer periphery of the lid 11. When the lid 11 is connected with the outer container 10, the leg 40 engages the outer and upper edge 29 of the liner. As shown best in FIGS. 1, 2, and 9, the main lid 11 is provided with an opening 41 for the purpose of providing access to the interior of the bait receiving chamber 12 when the main lid 11 is attached to the outer container 10. As shown, the opening is defined, in part, by the inner mating leg 36.

An access lid recess 42 is provided in the outer surface 35 adjacent to the mating leg 36. This access lid recess 42 extends outwardly from the leg 36 and accommodates the access lid 14 when it is in its closed position. Thus, the depth of the recess 42 is approximately equal to the thickness of the outer edge of the access lid 14.

Positioned on the front edge of the opening 41 is a further recessed area 44 to facilitate opening of the access lid 14. As shown best in FIGS. 6, 7, 8 and 9, the recess 44 extends forwardly beyond the access door accommodating recess 42 and is deeper (further from the surface 34) than the access lid recess 42. This recess 44 accommodates an opening tab 45 of the lid 14, and enables a user to manually insert a finger into the recess 44 to engage the front edge of the tab 45 to open the lid 14.

The upper portion of the main lid 11 adjacent to the rearward side of the opening 41 includes a pair of hinge receiving portions 46,46. These hinge receiving portions 46,46 comprise a generally cylindrical recess and are designed to receive corresponding cylindrical hinge posts 48,48 on opposite ends of the rearward edge of the lid 14. This allows the lid 14 to be pivoted between an open position as shown in FIG. 1 and a closed position as shown in FIG. 10.

The lid 14 includes a generally planar outer surface having a forwardly extending opening tab 45 and a pair of rearwardly positioned cylindrical hinge posts 48 as described above. The bottom surface of the lid 14 includes a closed loop mating leg 49 extending downwardly from the bottom surface of the lid 14 for mating engagement with the inner surface of the leg 36 as shown best in FIG. 10. The leg 49 is preferably beveled slightly to accommodate and mate with the bevel on the leg 36. This enables the lid 14 to be easily opened and closed while still maintaining tight, mating engagement between the legs 49 and 36.

Figure 5:
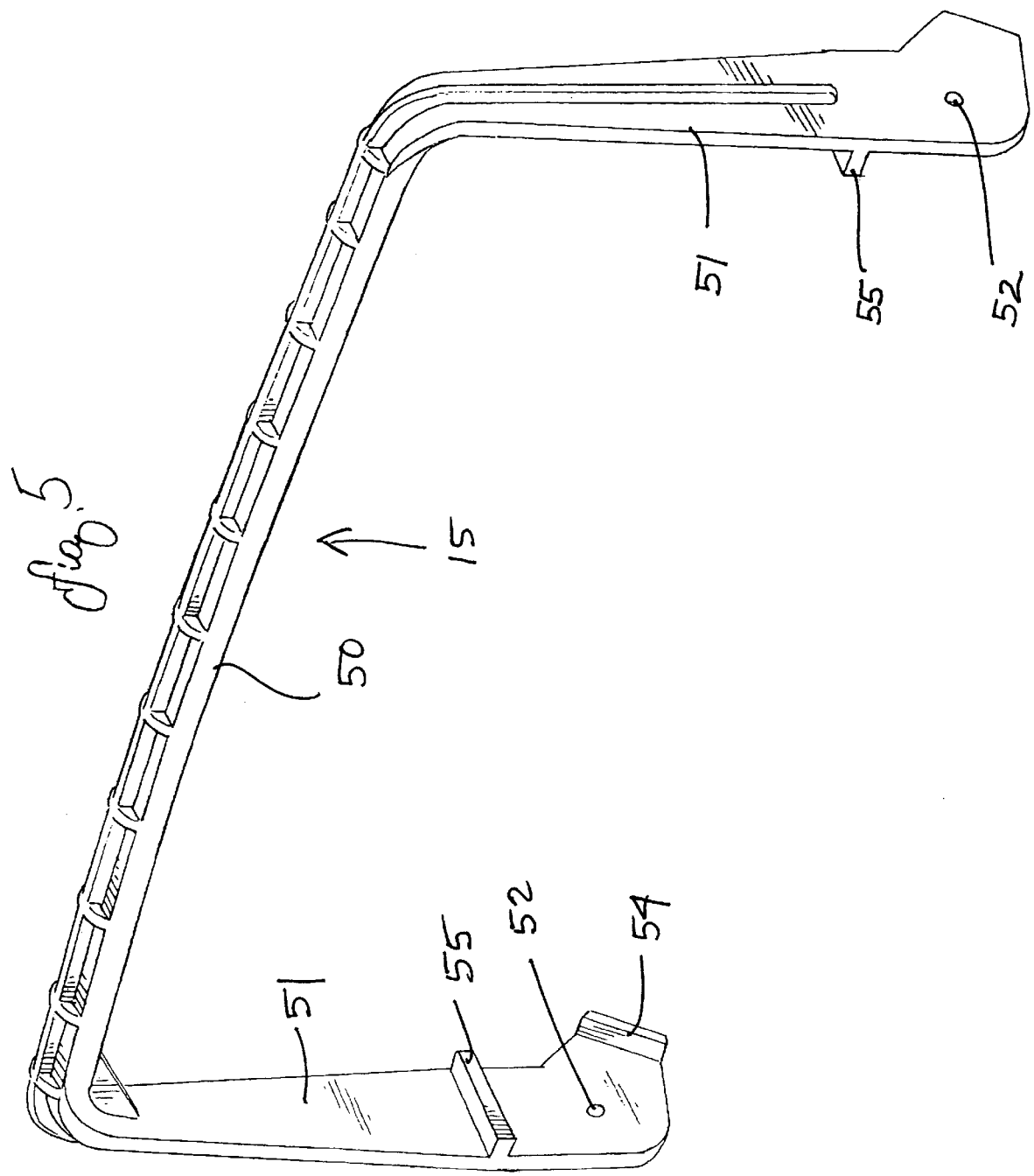
FIG. 5 is an isometric view of a portion of the bait bucket handle showing a portion of the lid locking means.
Figure 6:
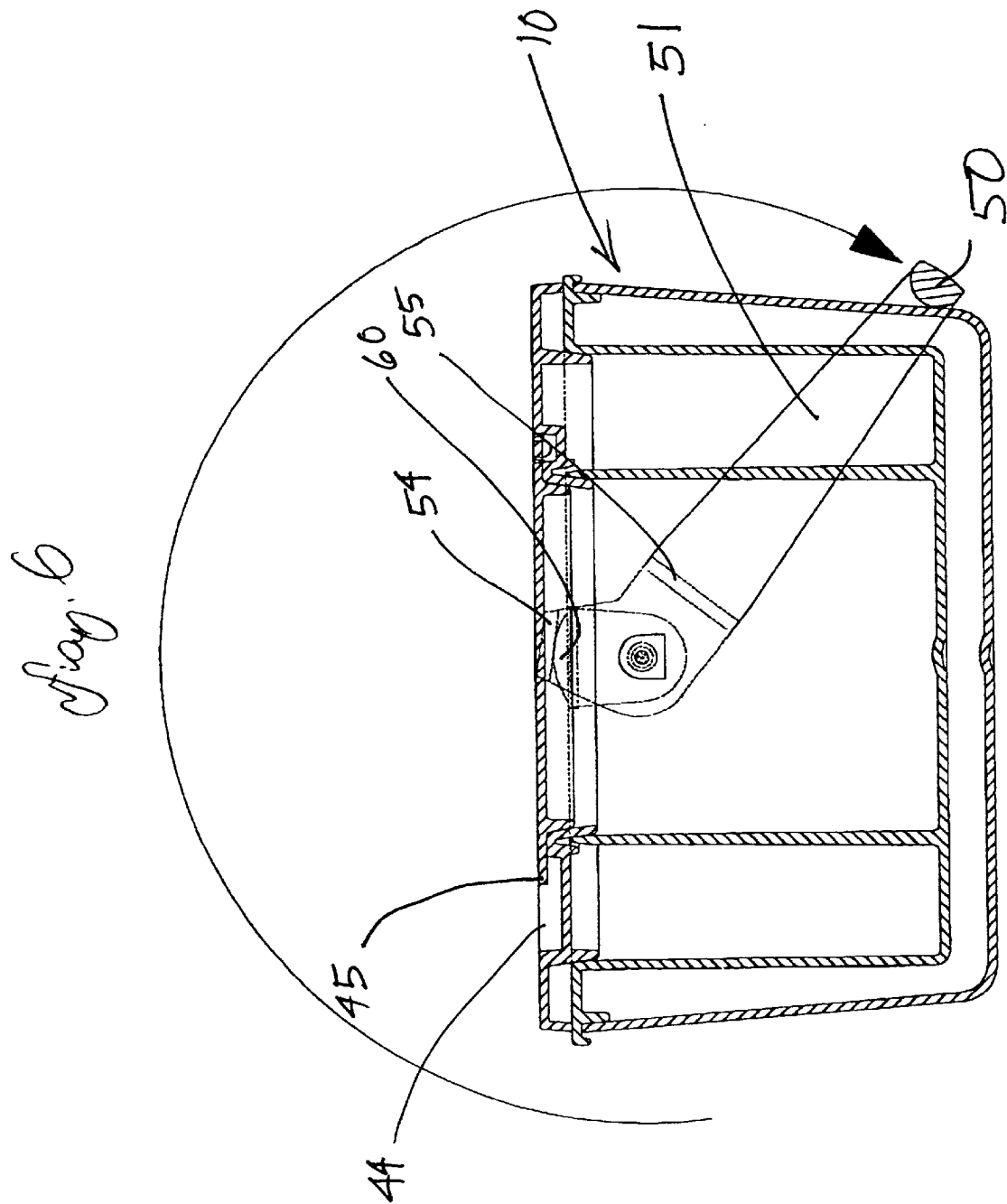
FIGS. 6, 7 and 8 are fragmentary views showing portions of the handle and the main lid in various attached and detached positions.
Figure 7:
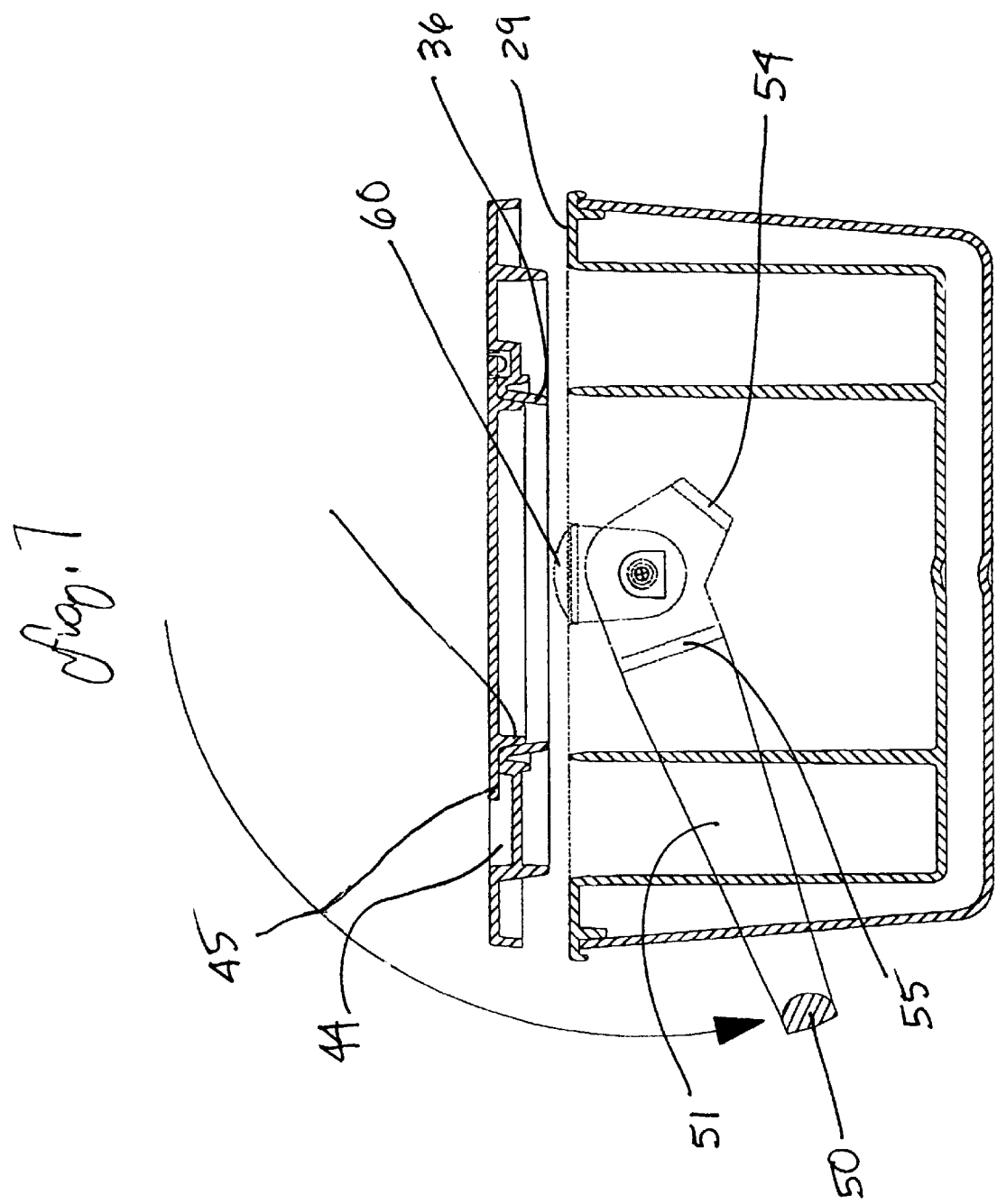
Figure 8:
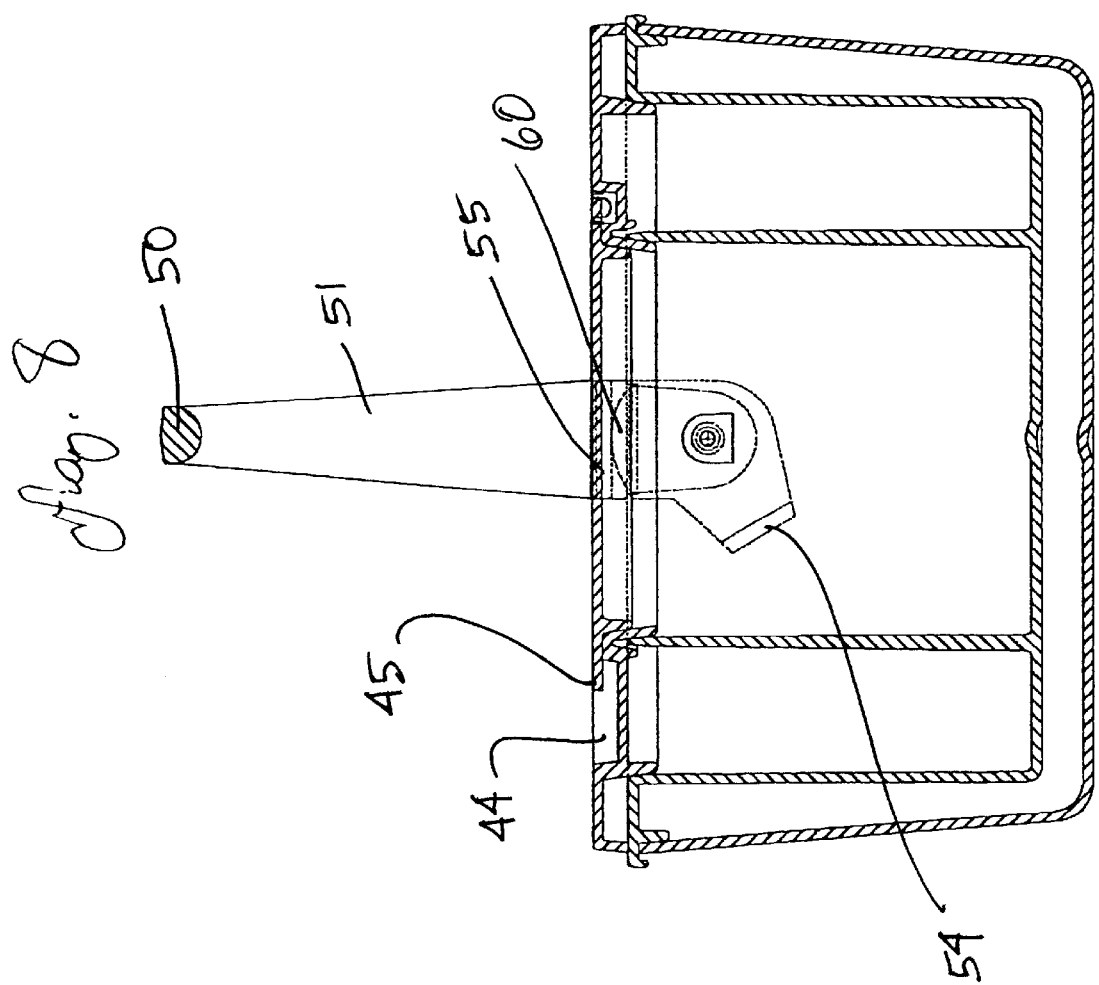

Reference is next made to FIGS. 5–8 showing the handle 15 and portions of the lid 11 for selectively attaching the lid 11 to, and detaching the lid 11 from, the outer container 10. Specifically, the connecting mechanism is designed so that when the handle 15 is in an up or carrying position as shown in FIG. 8 and one of the down or non-carrying positions as shown in FIG. 6, the lid 11 is latched to the outer container 10, while when the handle 15 is in the other down or non-carrying position as shown in FIG. 7, the lid 11 is detached from the outer container 10.

The handle 15, as shown best in FIG. 5, includes a central carrying portion 50 extending substantially across the outer container 10 and a pair of side portions 51 extending from the carrying portion 50 at substantially right angles. The distal end of each of the side portions 51 includes a hole 52 for pivotally connecting the handle to the outer container end and a pair of attachment cam members 54 and 55. As shown, the cam members 54 and 55 extend inwardly from the inner surface of the portions 51 and are equally spaced from the pivot hole 52.

As shown best in FIGS. 1 and 2, the handle 15 is pivotally mounted to the outer container 10, and specifically to the handle mounts 17,17, via a pair of pins 56. To accommodate the cam portions 54 and 55, the handle mounts 17,17 are rigidly and integrally formed with an outer top portion of the container 10 and have a thickness of at least equal to the height of the cam portions 54 and 55.

Figure 9:
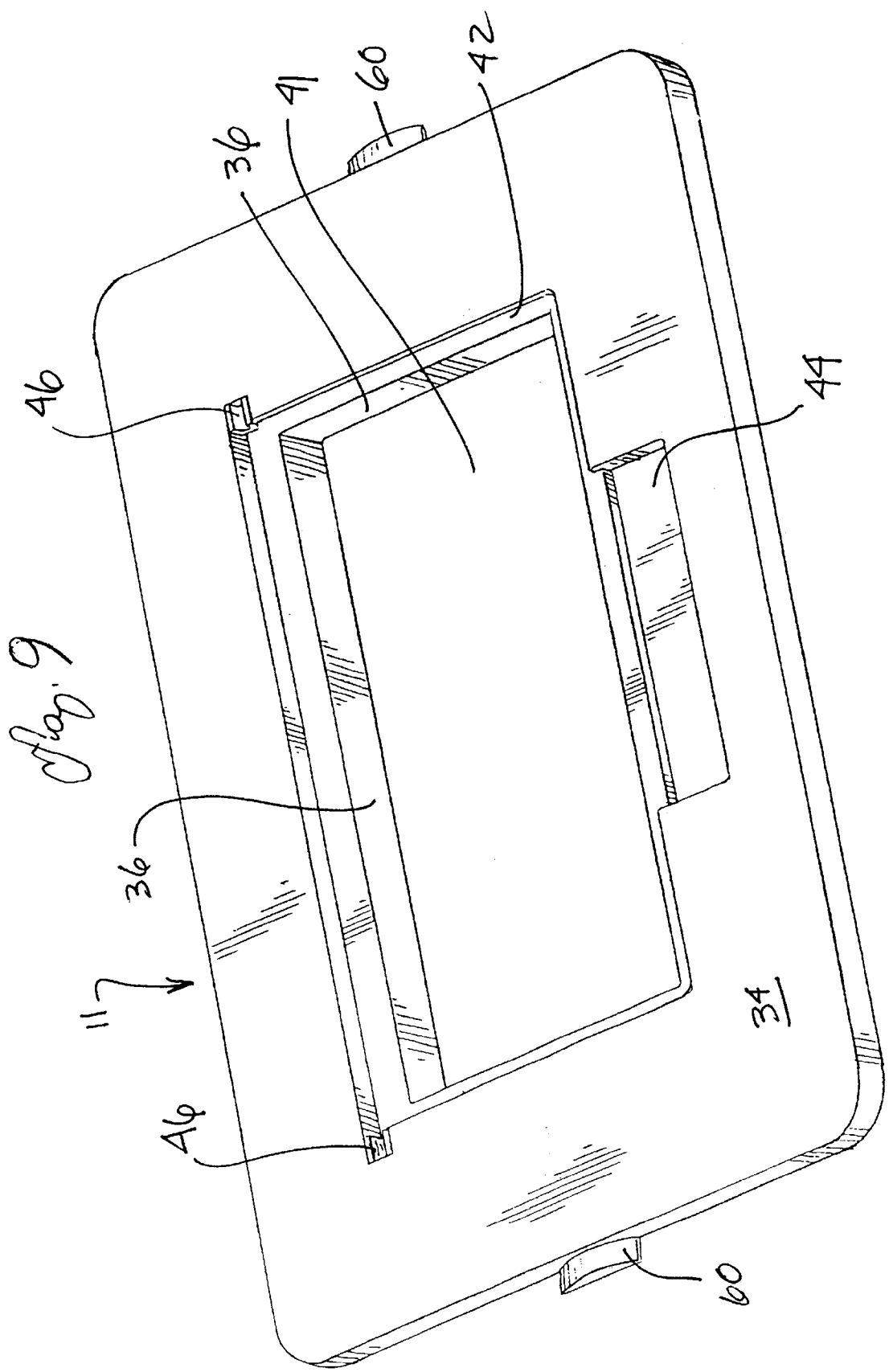
FIG. 9 is an isometric view of the main lid, with the access lid removed.

As shown in FIGS. 1 and 9, each side edge of the main lid 11 is provided with a cam member 60. The cam members 60 are integrally formed with the main lid 11 and are designed to mate with the cam portions 54 and 55 to attach the main lid 11 to the outer container 10. The selective attachment and detachment of the lid 11 relative to the outer container 10 is illustrated best in FIGS. 6, 7 and 8. Specifically, when the handle is in a down, non-carrying position to one side of the bucket (FIG. 6), the cam portion 54 engages the top surface of the cam member 60 to attach the lid 11 relative to the container body 10. Similarly, when the handle 15 is moved to an up or carrying position as shown in FIG. 8, the cam portion 55 engages the cam portion 60 to attach the lid to the container body 10. When the handle 15 is in the other down, non-carrying position as shown in FIG. 7, the cam member 60 is free of any engagement with a handle cam member. This enables the lid 11 to be removed from the outer container. Accordingly, with the structure of the present invention, the lid 11 is selectively attached to the outer container when the handle 15 is in an up, carrying position and one of its down, non-carrying positions, but detached from the outer container when the handle 15 is in the other of the down, non-carrying positions.

Having described the detailed structure of the preferred embodiment, the use of the bait bucket of the invention can be understood as follows. First, the handle 15 is moved to the position illustrated in FIG. 7 and the lid 11 is removed. Next, ice 23 or other cooling means is provided to the interior of the container in the ice cavity 16. The lid 11 is then replaced and the handle 15 is moved to the opposite side of the container. This latches the lid to the container and prevents its inadvertent removal. Fishing bait can then be introduced into the bait receiving chamber 12 by opening the access lid 14. The ice 23 within the chamber 16 keeps the chamber 12 and thus the bait therein cool. The entire bait bucket can be carried from one location to another without the lid 11 being removed or detached by pivoting the handle 15 to its up or carrying position as shown in FIG. 8. When use is finished, the handle 15 is moved to the position shown in FIG. 7, the lid 11 is removed and the ice or other cooling medium is removed from the cavity 16.

Although the description of the preferred embodiment has been quite specific, it is contemplated that various modifications could be made without deviating from the spirit of the present invention. Accordingly, it is intended that the scope of the present invention be dictated by the appended claims rather than by the description of the preferred embodiment.

What is claimed is:

1. A fishing bait bucket comprising:
    an outer container having an outer container wall and an open top and comprised of an insulating material;
    an inner bait receiving chamber located inside said outer container, said inner chamber having an inner chamber wall spaced inwardly from said outer container wall to define an ice receiving cavity therebetween and permanently joined to said outer container;
    a main lid covering said open top of said outer container and being selectively attached to or detached from said outer container;
    said main lid having an access lid positioned in the area of said inner bait receiving chamber to provide access to said inner chamber without removing said main lid from said outer container; and
    a handle pivotally connected with said outer container at first and second points between a carrying position and a first non-carrying position on one side of said outer container and between said carrying position and a second non-carrying position on the other side of said outer container wherein said main lid is latched to said outer container when said handle is in said carrying position and one of said first and second non-carrying positions and is unlatched from said outer container when said handle is in the other of said non-carrying positions.

2. The fishing bait bucket of claim 1 wherein said bait receiving chamber includes an upper edge and an open top.

3. The fishing bait bucket of claim 2 wherein said main lid includes a top, outer surface and a bottom, inner surface and wherein said inner surface includes a mating portion to mate with at least a portion of said upper edge.

4. The fishing bait bucket of claim 3 wherein said mating portion includes a first mating rib extending past said upper edge when the main lid is attached to said outer container.

5. The fishing bait bucket of claim 1 wherein said access lid is pivotally connected to said main lid and is pivotable between a closed position and an open position providing access to said inner chamber.

6. The fishing bait bucket of claim 5 wherein said access lid includes a generally planar top and an opening tab comprised of an extension of said planar top.

7. The fishing bait bucket of claim 6 wherein said main lid includes an access recess in the area of said opening tab to provide manual access to said opening tab to pivot said access lid from said closed position to said open position.

8. The fishing bait bucket of claim 1 wherein said inner bait receiving chamber is integrally formed with said outer container.

9. A fishing bait bucket comprising:
    an outer container having an outer container wall and an open top and comprised of an insulating material;
    an inner bait receiving chamber located inside said outer container and including an upper edge and an open top, said inner chamber having an inner chamber wall spaced inwardly from said outer box wall to define an ice receiving cavity therebetween;
    a main lid covering said open top of said outer container and being selectively attached to or detached from said outer container, said main lid further including a top, outer surface and a bottom, inner surface and wherein said inner surface includes a mating portion to mate with at least a portion of said upper edge, said mating portion including a first mating rib extending past said upper edge when the main lid is attached to said outer container, said mating portion further including a second mating rib spaced from said first mating rib to define a mating channel to receive said upper edge; and
    an access lid located within said main lid, said access lid positioned in the area of said inner chamber to provide access to said inner chamber without removing said main lid from said outer container.

10. A fishing bait bucket comprising:

an outer container having an outer container wall and an open top and comprised of an insulating material;

an inner bait receiving chamber located inside said outer container; said inner chamber having an inner chamber wall spaced inwardly from said outer container wall to define an ice receiving cavity therebetween and permanently joined to said outer container;

a main lid covering said open top of said outer container and being selectively attached to or detached from said outer container;

said main lid having an access lid positioned in the area of said inner bait receiving chamber to provide access to said inner chamber without removing said main lid from said outer container; and a handle pivotally connected with said outer container at first and second points wherein said handle includes a locking portion and said main lid includes a locking surface engageable by said locking portion.

11. The fishing bait bucket of claim 10 wherein said outer container includes first and second side portions corresponding to said first and second ends of said main lid.

12. The fishing bait bucket of claim 11 wherein said handle includes a central carrying portion and first and second pivot portions positioned at opposite ends of said carrying portion.

13. The fishing bait bucket of claim 12 wherein said first and second pivot portions are pivotally connected respectively to said first and second side portions.

14. The fishing bait bucket of claim 13 wherein said handle is pivotable between a carrying position and a first non-carrying position on one side of said outer box and between said carrying position and a second non-carrying position on the other side of said outer box.

15. The fishing bait bucket of claim 14 wherein each of said first and second pivot portions includes a locking portion comprised of first and second locking portions selectively engageable with said locking surface at each of said first and second ends to attach said main lid to said outer box when said handle is in first and second positions.

* * * * *

UNITED STATES PATENT AND TRADEMARK OFFICE
CERTIFICATE OF CORRECTION

PATENT NO. : 6,237,765 B1
DATED : May 29, 2001
INVENTOR(S) : Hagen et al.

Page 1 of 1

It is certified that error appears in the above-identified patent and that said Letters Patent is hereby corrected as shown below:

<u>Column 3,</u>
Line 65, reads "lid 1I also", should read -- lid 11 also --

Signed and Sealed this

Twenty-sixth Day of February, 2002

Attest:

JAMES E. ROGAN
*Attesting Officer*     *Director of the United States Patent and Trademark Office*